Nov. 20, 1962  A. TATAREK  3,064,700
NUT CRACKER, FRUIT SQUEEZER OR THE LIKE
Filed Nov. 13, 1959
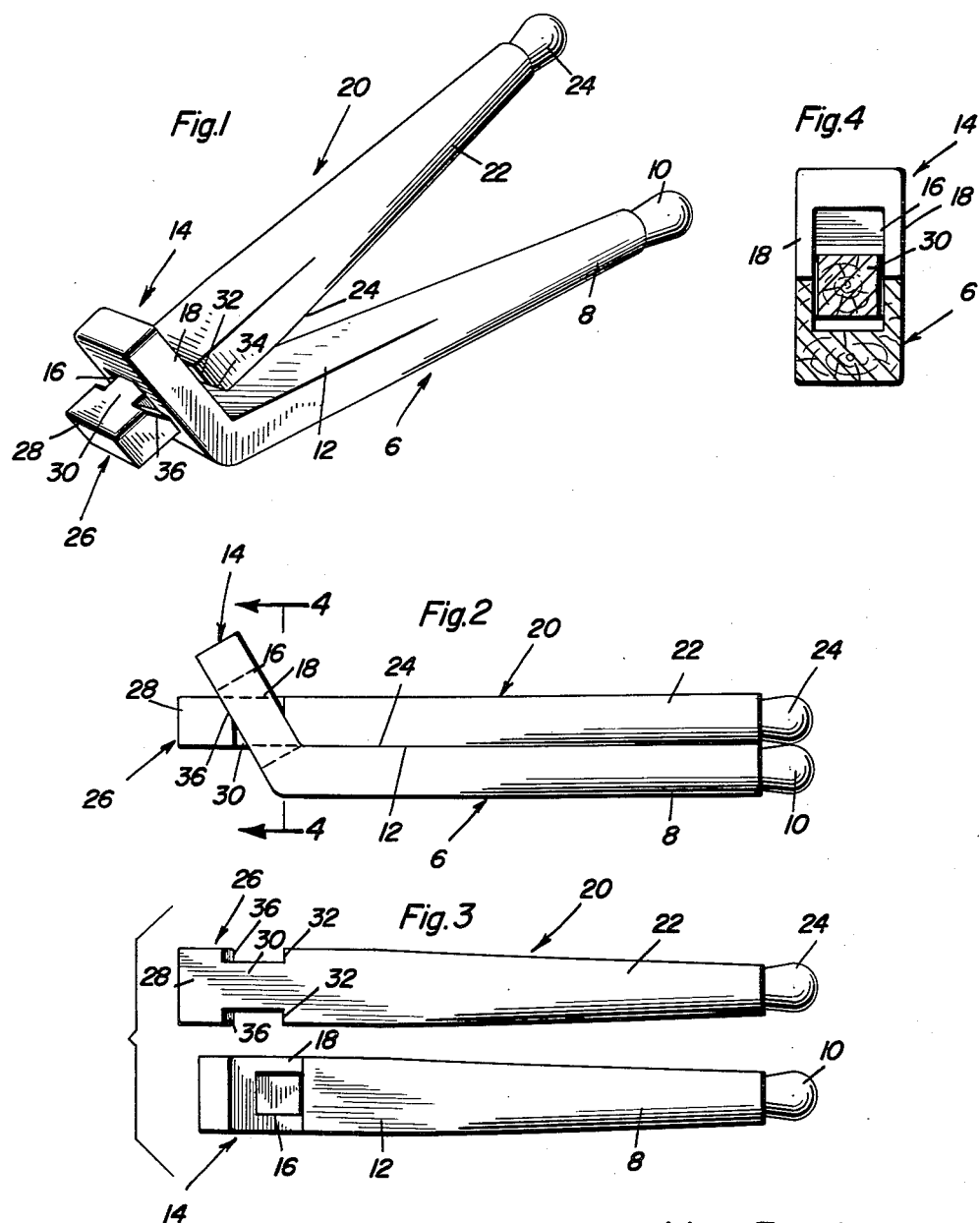
Adam Tatarek
INVENTOR.
BY *Clarence A. O'Brien*
*and Harvey B. Jackson*
Attorneys

United States Patent Office 3,064,700
Patented Nov. 20, 1962

1

3,064,700
NUT CRACKER, FRUIT SQUEEZER OR THE LIKE
Adam Tatarek, Schenectady, N.Y., assignor of thirty-three and one-third percent to Adam F. Ciesinski, Schenectady, N.Y.
Filed Nov. 13, 1959, Ser. No. 852,822
3 Claims. (Cl. 146—13)

This invention relates to an improved hand tool or implement having many uses but which, for general classification purposes, may be categorized as an improved nut cracker.

Nut crackers of the type under consideration are characterized by a pair of handle-equipped lever units having their outer ends pivotally or otherwise hingedly joined together. Many such nut crackers have been patented. One example is that shown in Patent 1,268,484 of June 4, 1918. Another one, more analogous to the instant subject matter, would be the one depicted in FIG. 1 of Patent 1,312,149.

An object of the instant invention is to improve upon the above mentioned or any similarly made nut crackers. To this end, the improvement herein revealed resides in the specific construction of the outer connectable ends of the lever units; that is, a unique joint wherein the component parts thereof go to make up a strong, durable and reliable joint which, when once completed, will not come apart. In this connection it will be noted that the joint is wholly free of hinge-pins or equivalent fasteners.

More specifically the improved tool or implement comprises a first lever unit having a handle at its inner end and an oblique angled assembling and retaining head at its outer end, said head being elongated and having a lengthwise slot therein, and a second one-piece lever unit opposed to and complemental with said first lever unit and also having a corresponding companion handle at its inner end and an integral T-shaped member at its outer end, said T-shaped member embodying a head and a reduced neck having outstanding shoulders at its junctional connection with the outer end of the lever, said shoulders being operatively situated to movably abut an adjacent inward face of the slotted head, said neck extending through and beyond said slot, and the head of the T-shaped member cooperating with the outward face of said slotted head and bridging the slot and linking and joining the two units together in operative association, said neck being free to slip and slide freely in said slot.

In carrying out a preferred embodiment of the invention the lever units constitute two wooden members. Each member is of a suitably chosen grade of hardwood such as maple, ash, apple, locust or the like. In fact each specially cut out and suitably shaped wooden component is of solid one-piece construction. Experience has shown that by using wooden parts or units they may be nicely shaped, varnished or painted any color for attractiveness. The implement is such that it should appeal to the economical practices of makers and the finished product is inexpensive, light in weight, not hazardous or dangerous to use by small children and otherwise appropriately adapted to provide the owners thereof with an implement whose joint is unique and in fact raises one's curiosity and intentionally poses a puzzle, so to speak, as to how the solid one-piece components are deftly assembled and hingedly joined and yet do not come apart once the joint has been completed.

Other objects, features and advantages will become more readily apparent from the following description and the accompanying drawing.

In the drawing, wherein like numerals are employed to designate like parts throughout the views:

FIG. 1 is a view in perspective of a hand tool or implement (nut cracker or the like) constructed in accordance with the principles of the present invention.

FIG. 2 is a view in side elevation showing how the unique joint allows the lever units to collapse into close contacting relationship for compactness and convenience.

FIG. 3 is a plan view of the lever units separated.

FIG. 4 is a sectional view on the vertical line 4—4 of FIG. 2, drawn on a slightly enlarged scale.

The first lever unit is denoted by the numeral 6. It comprises a tapering handle portion 8 circular in cross-section and terminating at the inner end in a suitable ornamental knob or grip 10. The median body portion of the lever is preferably rectangular in cross-section to provide a flat clamping and squeezing surface as at 12. The outer end is directed at an oblique angle to define what is here described as a generally rectangular head 14. This head is also rectangular in cross-section provided centrally with an elongated or rectangular slot 16 closed at its ends, the side portions of said head being denoted at 18. The complemental and companion second lever unit is denoted at 20 and it too has a tapering handle 22, like the handle 8, and terminates in a knob 24. Also, the body portion is rectangular in cross-section to provide a plane or flat surface 24 which is opposed to surface 12 to facilitate holding and squeezing of fruit, nuts or other objects or articles placed between the "jaws" 12 and 24. The outer end of the lever unit 20 has a T-shaped member or extension which is denoted by the numeral 26 and comprises a substantially rectangular cross-head or head portion 28 at the outer end of a reduced neck 30. The neck is also rectangular in cross-section and at its junctional connection with the body portion it provides a pair of shoulders 32 (FIG. 3) having chamfered or beveled surface portions 34 for clearance and operational needs. The shoulders existing at the junction of the head 28 portion and outer end of the neck 30 also have suitably arranged companion chamfered or beveled surfaces 36. The head 28 with its shoulders is located to the left of the head 14 and the shoulders 32 are located to the right of the head. Stated otherwise the neck extends through the slot 16. It will be noticed that there is no hinge or positive fastener connection here and that under the circumstances the neck shifts and slides freely the length of the slot. The head portion of the T-shaped member, that is, the head portion 28 is such in length that it is longer than the width of the slot so that it extends crosswise or at right angles to the slot 16 when the parts are assembled when shown in FIGS. 1, 2 and 4.

It will be evident from a careful study of the drawing that the slot 16 is elongated and of a length greater than the cross-sectional dimension of the neck 30 so as to permit the neck 30 to shift and slide freely but, at the same time, to prevent axial turning of the neck in the slot. Also as mentioned the T-shaped member defines not only the neck but also a head portion resembling a rectangular block and the length of the block is slightly shorter than the length of the slot to pass through the slot when properly aligned therewith during the assembling step. It is also longer than the width of the slot in order to effectually bridge the slot at right angles to the lengthwise dimension of the slot. As a matter of fact the length of the block is about the same as the cross-section of the slotted head 14 so that the ends of the block are flush with the exterior lengthwise surfaces 18 of the slotted head when the block or head 28 is cross-wise of the slot.

As has been pointed out it may be practical to make the lever units or parts of a suitable grade of plastic material wherein the side portions 18 of the slotted head could bend or bow to permit the T-shaped member to be passed through the slot and then turned at right angles to bring about the desired assembled or ready-to-function joint. It is preferred however that parts be of wood and the first step is to of course shape and form the wood to resemble the configuration of the parts illustrated in the views, particularly FIG. 3, of the drawing. Once this is accomplished the next step is to place the slotted head 14 sidewise in a vise with the handle pointing up that is when looking down into the cut-out or slot. Then, holding the handle of the unit 20 the block portion or head of the T 26 is lined up with and passed through the slot. In order to accomplish this it is necessary that the head 14 of the part or unit 6 must have been placed in very hot or boiling water so as to make the side portions 18 sufficiently pliable to allow the T-shaped member to be passed through the slot 16 and then slowly and gently turned clockwise to bring about the desired assembled relationship of the joint parts or components 14 and 26. Once the joint is effected and with the parts in proper proportional relationship it will be seen that it will not come apart. At the same time, the first thing that one wonders when looking, usually with curiosity, at this joint is how the joint is effected and maintained. Experimentation with all sorts of hard woods and the making of numerous implements has, however, proved that the construction herein shown and described is practical, simple, safe to use and is, as far as is known, unlike any other implement in its field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use when squeezing, clamping, and holding various objects; a manually usable pliers-like implement consisting of two units only; namely, a first one-piece lever unit having a handle at its inner end and an oblique angled assembling and retaining head at its outer end, said head being elongated and having a lengthwise closed-ended slot therein, and a second one-piece lever unit opposed to and complemental with said first lever unit and also having a corresponding companion handle at its inner end and an integral T-shaped member at its outer end, said T-shaped member embodying a head and a reduced neck, said neck being rectangular in cross-section and having outstanding shoulders at its junctional connection with the outer end of said companion handle, said shoulders being operatively situated to movably abut an adjacent inward face of the slotted head, said neck extending through and beyond said slot, and the cross-head of the T-shaped member cooperating with the outward face of said slotted head and bridging the slot and hingedly linking and joining the two units together in operative association, said slot being elongated and of a length and width greater than the cross-sectional dimension of said neck whereby the neck cannot turn but is free to shift and slide in the slot also of a length and width slightly greater than the length and cross-section of said cross-head.

2. For use when squeezing, clamping, and holding various objects; a manually usable pliers-like implement consisting of but two companion units; namely, a first one-piece lever unit having a handle at its inner end and an oblique angled assembling and retaining head at its outer end, said head being elongated and having a lengthwise slot therein, and a second one-piece lever unit opposed to and complemental with said first lever unit and also having a corresponding companion handle at its inner end and an integral T-shaped member at its outer end, said T-shaped member embodying a head and a reduced neck non-circular in cross-section and having outstanding shoulders at its junctional connection with the outer end of said companion handle, said shoulders having clearance bevels and being operatively situated to movably abut an adjacent inward face of the slotted head, said neck extending through and beyond said slot, and the head of the T-shaped member cooperating with the outward face of said slotted head and having beveled shoulders bridging the slot and linking and joining the two units together in operative association, said slot being elongated and of a length greater than the cross-sectional dimension of said neck whereby the neck cannot turn but is free to shift and slide in the slot, and the head of said T-shaped member being in the form of a rectangular block, the length of said block being slightly shorter than the length of said slot to pass through the slot when properly aligned therewith and longer than the width of the slot in order to effectually bridge the slot at right angles to the lengthwise dimension of the slot.

3. The structure defined in claim 2 and wherein the length of said block is about the same as the cross-section of the slotted head so that the ends of the block are flush with the exterior lengthwise surfaces of the slotted head when the block is cross-wise of the slot.

References Cited in the file of this patent

UNITED STATES PATENTS

| 896,044 | Quackenbush | Aug. 11, 1908 |
| 1,268,484 | Olasz | June 4, 1918 |
| 1,312,149 | Zaljs | Aug. 5, 1919 |
| 2,568,909 | Booth | Sept. 25, 1951 |